Patented Feb. 27, 1934

1,948,756

UNITED STATES PATENT OFFICE 1,948,756

COMPOSITION OF MATTER

George F. Hadley, Pittsburgh, Pa., assignor to Westinghouse Electric & Manufacturing Company, a corporation of Pennsylvania No Drawing. Original application August 11, 1927, Serial No. 212,363. Divided and this application May 6, 1931. Serial No. 535,554

8 Claims. (Cl. 87—17)

My invention relates to a new composition of matter and more particularly to a composition of matter which may be employed as a binding agent for mica plates and is a division of my application, Serial No. 212,363, filed August 11, 1927.

The principal object of my invention is to provide an improved binding agent for mica plates, or mica plates and a reinforcing paper sheet associated therewith, that is compartively stable at elevated temperatures.

Another object of my invention is to produce a new composition of matter that may be applied, as a hydrocarbon solution, to mica plates and which, upon evaporation of the solvent, will serve as a binder to secure the mica plates together and will have the distinctly favorable qualities of compartively low swelling and non-emission of gaseous vapors when subjected to comparatively high temperatures.

A further object of my invention is to provide a new composition of matter which may be employed as a binding agent for mica plates and, when subjected to prolonged heating at 150° C., will give minimum vapor pressure and will be relatively free from decomposition.

A still further object of my invention is to provide a new composition of matter comprising a natural hydrocarbon, a polymerized vegetable oil and the reaction product of a resinous fluxizing agent and a polyhydric alcohol.

It has heretofore been the practice to employ shellac as a binding agent for mica plates, or for mica plates and a reinforcing sheet of paper or cloth. Such material is known in the art as "mica-folium" and is applied as an insulation to conductors of turbo-generators and other rotating electrical apparatus by wrapping it around the coils or conductors of the machine.

Insulation produced in this manner has not proved entirely satisfactory for insulating the coils of turbo-generators because, when the insulation is subjected to the relatively high temperatures which occur in such machines, it has the tendency to swell, after which it deteriorates very rapidly.

During my researches to discover the cause of this phenomena, I have found that the swelling of the insulation is caused by the pressure produced by the shellac becoming liquid at the operating temperature and to the formation of a gas or vapor in the mica laminations. As is well-known, shellac differs from other resins in that it is not readily soluble in the ordinary vegetable or mineral oils, and it is, therefore, necessary to apply it to the mica plates in the form of an alcohol solution, from which the alcohol does not completely evaporate.

Alcohol has a low-boiling point, and, therefore, its vapor pressure is high at relatively low-temperatures. For example, at 115° C., alcohol has a vapor pressure of 55 pounds per square inch, and, if heated to higher temperatures, the vapor pressure becomes considerably higher. Shellac itself softens at comparatively low temperatures, and, when subjected to a temperature ranging from 100° C. to 150° C., becomes liquid. The pressure resulting from the liquid shellac, together with the vapor pressure resulting from the alcohol and the moisture from the paper used as a reinforcing member, cause the swelling, previously mentioned, which is apparently the first stage in the decomposition of the insulating material.

The tendency at the present time is to develop turbo-alternators capable of generating current at a much higher voltage than was formerly the practice. It can, therefore, be readily understood that a shellac binder for mica-folium is impractical for high-voltage turbo-generators, as considerable loss results from the continuous swelling and decomposition of the insulation, thereby necessitating the discontinuance of the generator while the insulation is being repaired.

I have discovered a new composition of matter, which may be employed as a binding agent for mica-folium, in which the emission of gaseous vapors is so slight that they do not cause the insulation to swell. Furthermore, my composition has the desirable characteristic that, by varying the proportion of the chemical ingredients, its softening point may be raised or lowered to suit the temperature to which the insulating material will be subjected.

The following specific examples will illustrate and explain the essential features of my new composition of matter. 32 pounds of rosin, 22 pounds of China wood oil and 3½ pounds of glycerol are heated together in a suitable varnish kettle which is completely covered, with the exception of apertures provided for the insertion of the thermometer and stirring paddles. The heating operation is carried on as rapidly as practicable until the temperature reaches 300° C., the mixture being maintained at this temperature for about 30 minutes, 92 pounds of pulverized manjak are then added, and the heating is continued, with an occasional stirring at 250° C., for approximately four hours, or until the fusion of the composition is complete, the mixture free from lumps and substantially all excess gaseous material driven off. The material is then poured into pans and allowed to cool, after which it is ground, passed through a 15 mesh sieve, and the pulverized bond thus obtained is dissolved in a hydrocarbon solvent, such as gasoline, benzol, tolul, xylol, or in a mixture of two or more of such solvents.

In utilizing my new composition of matter, as a binding agent for mica plates, I prefer to employ a composition composed of about 160 lbs. of pulverized bond and about 20 pounds of stearine pitch dissolved in a solvent consisting of 16 gallons of benzol and 16 gallons of gasoline, but, of course, the amount of solvent added may be varied to suit any particular requirements. After the bonded material has been applied to the mica plates and dried, the bond that is produced does not contain more than about .05% of solvent material, has a melting point of about 200° C., but softens sufficiently at 150° C., to give proper adhesiveness for wrapping turbo-coils.

My new composition of matter is low in volatile matter and is characterized by having high flexibility and a low dielectric or insulation power loss. The increased flexibility and low volatile content of my improved binding agent permit the percentage of mica in the composite insulation sheet to be increased and make possible the employment of thinner insulation walls for the same voltage, thus improving the space factor and permitting the use of generators having smaller slots. A solution of shellac applied to mica-folium, in a similar manner, melts at 100° C., contains about 3% of solvent material and has a softening temperature between 60° C. and 100° C.

In producing my improved binding agent, advantage is taken of the fact that China-wood oil, when heated at 250° C. to 270° C., rapidly polymerizes to a stiff jelly-like gum which is soluble in hot resin. The glycerol is added to reduce the acid value of the resin which is effected at the boiling point of glycerol, the acid of the resin combining with glycerol to form a glycerol-ester gum. It will, therefore, be understood that, when the mixture is heated to approximately 300° C., the processes of polymerizing the China-wood oil, forming the acid-free resin-ester, and the distilling off of excessive gaseous material are carried on simultaneously.

The above ingredients may be mixed in different proportions; for example, I have found that, when 8 parts of China-wood oil, 12 parts of rosin and one part of glycerol are mixed together and heated for 20 minutes at a temperature of approximately 300° C., a sticky gum is obtained which softens at about 60° C., and, upon heating at 150° C. for 24 hours, it has a volatile loss of less than 1%. This product may then be fused with stearine pitch or natural hydrocarbons, such as gilsonite or manjak, in various proportions, and a bonding material be thus obtained which softens at temperatures varying with the proportions of stearine pitch, gilsonite or manjak and which is free from tackiness at ordinary temperatures. Gilsonite fused into the above composition, in the proportion of one part of gilsonite, by weight, to two parts of the composition, by weight, produces a black bonding material which has a softening point of 95° C. to 100° C. The volatile material given off is less than .82%, when exposed to a temperature of 150° C. for 24 hours. When bonding material is dissolved in a solvent in the ratio of one part of gum to two parts of solvent, it may be applied to the mica plates and the reinforcing material employed, in the usual manner, to form micafolium.

It will be understood that my invention is not limited to the specific example given. For example, other natural or synthetic resins, may serve as fluxizing resins in the above process, such as copal, resin esters or the synthetic resins produced by the reaction of glycerol and phthalic anhydride. Other vegetable drying oils may be used in place of China-wood oil, such as, linseed or perilla oil. Stearine pitch or gilsonite, glance pitch, and other natural hydrocarbons and especially those having a high melting point, may be used in place of all or a portion of the manjak. Gilsonite has proved particularly useful for this purpose. Other polyhydric alcohols may be substituted for glycerol, such as, ethylene or propylene glycol, mannitol, or, in fact, any polyhydric alcohol which will serve to reduce the acidity of the resin. The proportions may also be widely varied, the amount of natural hydrocarbons that is added depending upon whether a higher or lower softening point is desired.

While I have disclosed my invention in considerable detail and have given specific examples, it will be understood that the examples should be construed as illustrative and not by way of limitation, and, in view of the numerous modifications which may be effected therein without departing from the spirit and scope of my invention, it is desired that only such limitations shall be imposed as are indicated in the appended claims.

I claim as my invention:

1. A composition of matter comprising a polymerized vegetable drying oil, a natural pitchy hydrocarbon and the reaction products of a polyhydric alcohol and rosin the composition being thermoplastic and adapted to bond mica plates for high voltage insulation.

2. A composition of matter comprising polymerized China-wood oil, manjak, and the reaction products of a polyhydric alcohol and rosin the composition being thermoplastic and adapted to bond mica plates for high voltage insulation.

3. A composition of matter comprising polymerized vegetable oil, a natural pitchy hydrocarbon, the reaction product of a polyhydric alcohol and rosin and a solvent the composition being thermoplastic and adapted to bond mica plates for high voltage insulation.

4. A composition of matter comprising polymerized China-wood oil, manjak, the reaction product of glycerol and rosin and a solvent the composition being thermoplastic and adapted to bond mica plates for high voltage insulation.

5. A composition of matter comprisisng polymerized China-wood oil, manjak, the reaction product of glycerol and rosin and a hydrocarbon solvent the composition being thermoplastic and adapted to bond mica plates for high voltage insulation.

6. The method of producing a binder to secure mica plates together which comprises heating a vegetable drying oil, a natural pitchy hydrocarbon, a polyhydric alcohol and a resin together to a temperature between 250° C. and 300° C. until the vegetable oil polymerizes, the resin reacts with the glycerol, and all excess volatile matter has been driven off the composition being thermoplastic and adapted to bond mica plates for high voltage insulation.

7. The method of producing a binder to secure mica plates together which comprises heating China-wood oil, manjak, glycerol and rosin together to a temperature of between 250° C. and 300° C. until the China-wood oil polymerizes, the glycerol reacts with the rosin and all excess volatile matter has been driven off the composition being thermoplastic and adapted to bond mica plates for high voltage insulation.

8. A composition of matter comprising polymerized vegetable drying oil, material selected from a group consisting of natural hydrocarbon pitch and stearine pitch, the reaction product of glycerol and a rosin, and a solvent, the composition being thermoplastic and adapted to bond mica plates for high voltage insulation.

GEORGE F. HADLEY.